United States Patent
Wu et al.

(10) Patent No.: US 8,748,525 B2
(45) Date of Patent: Jun. 10, 2014

(54) POLYESTER FILM AND METHOD OF FABRICATING THE SAME

(75) Inventors: Jyh-Horng Wu, Kaohsiung (TW); Cheng-Hsing Fan, Taichung (TW); Ming-Tsong Leu, Kaohsiung (TW); Chia-Hao Li, Tainan (TW); Yao-Tsu Wu, Tainan (TW); Chien-Pang Wu, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 190 days.

(21) Appl. No.: 13/303,131

(22) Filed: Nov. 22, 2011

(65) Prior Publication Data

US 2012/0149830 A1    Jun. 14, 2012

(30) Foreign Application Priority Data

Dec. 14, 2010  (TW) ............................... 99143757 A

(51) Int. Cl.
*C08K 9/04* (2006.01)
*C08K 3/36* (2006.01)
*C08L 67/02* (2006.01)
*C08G 63/60* (2006.01)
*C09K 19/38* (2006.01)
*B29C 55/12* (2006.01)

(52) U.S. Cl.
USPC ........... 524/445; 524/493; 524/539; 524/605; 428/1.33; 264/290.2

(58) Field of Classification Search
USPC .................. 524/445, 493, 539, 605; 428/1.33
See application file for complete search history.

(56) References Cited

U.S. PATENT DOCUMENTS

| | | | |
|---|---|---|---|
| 3,658,748 A * | 4/1972 | Anderson et al. | 523/220 |
| 3,859,097 A * | 1/1975 | Hamb et al. | 430/533 |
| 4,163,037 A * | 7/1979 | Niznik | 264/54 |
| 4,250,281 A * | 2/1981 | Riecke | 525/444 |
| 6,888,663 B2 * | 5/2005 | Bourdelais et al. | 359/296 |
| 7,425,590 B2 | 9/2008 | Hale | |
| 7,691,950 B2 | 4/2010 | Chakravarti et al. | |
| 2006/0270806 A1 * | 11/2006 | Hale | 525/439 |
| 2006/0272766 A1 | 12/2006 | Hebrink et al. | |
| 2007/0021585 A1 * | 1/2007 | Chen | 528/279 |
| 2008/0032220 A1 * | 2/2008 | Levy et al. | 430/58.65 |
| 2008/0161473 A1 * | 7/2008 | Leu et al. | 524/442 |
| 2010/0113673 A1 * | 5/2010 | Leu et al. | 524/445 |

FOREIGN PATENT DOCUMENTS

| | | |
|---|---|---|
| TW | 200827406 | 7/2008 |
| TW | 201016764 | 5/2010 |
| WO | 2009120574 | 10/2009 |

OTHER PUBLICATIONS

Gregory C. Gemeinhardt et al., "Influence of Ionomeric Compatibilizers on the Morphology and Properties of Amorphous Polyester/Polyamide Blends", Polymer Engineering and Science, vol. 44, No. 9, Sep. 2004, p. 1721-p. 1731.

Shinichi Kawasaki et al., "Preparation of a Novel Alloy Composed of Fluorene-Based Polyester and Polycarbonate and their Properties for the Optical Uses", Journal of Applied Polymer Science, vol. 111, 2009, p. 461-p. 468.

C.K. Samios et al., In situ compatibilization of polyurethane with poly(ethyleneterephthalate), European Polymer Journal 36, 2000, p. 937-p. 947.

Shahram Mehdipour-Ataei et al., "Preparation, characterization, and properties of new generation of polyesters containing bulky groups," Iranian Polymer Journal, 2007, p. 607-p. 614, vol. 16, No. 9.

"Office Action of Taiwan Counterpart Application", issued on Aug. 14, 2013, p. 1-p. 5, in which the listed references were cited.

* cited by examiner

*Primary Examiner* — Tae H Yoon
(74) *Attorney, Agent, or Firm* — Jianq Chyun IP Office

(57) ABSTRACT

A polyester film is described, including a first polyester and a second polyester. The weight ratio of the first polyester to the second polyester ranges from 1:1 to 1:3. The glass transition temperature of the first polyester is higher than 140° C. and that of the second polyester is lower than 140° C.

9 Claims, No Drawings

POLYESTER FILM AND METHOD OF FABRICATING THE SAME

CROSS-REFERENCE TO RELATED APPLICATION

This application claims the priority benefit of Taiwan application serial no. 99143757, filed Dec. 14, 2010. The entirety of the above-mentioned patent application is hereby incorporated by reference herein and made a part of this specification.

TECHNICAL FIELD

The disclosure relates to a polymer film and a method of fabricating the same, and more particularly to a single-layer, highly thermal-resistant and highly transparent polyester film and a method of fabricating the same.

BACKGROUND

A plastic substrate is an indispensable part of a flexible electronic display device. Currently, there are two main methods for fabricating a thin film of plastic substrate, wherein one method is solvent casting, while another method is melt extrusion. Selection of the methods to form a film is in accordance with the difficulty of the melt process of the thermoplastic polymer. Typically, the melt process for forming a film is suitable for a polymer with its glass transition temperature (Tg) lower than 140° C., such as polyethylene terephthalate (PET, Tg≈80° C., Tm≈250° C.) which is a semi-crystalline polyester and can be melt-processed easily. However, for a polymer with a glass transition temperature higher than 140° C., such as polycarbonate (PC, Tg≈150° C.) and polyethersulfone (PES, Tg≈220° C.), the segmental motion of the polymer chain units become difficult, and a high melt temperature is required for thermal plasticizing. If the melt process leads to a certain degree of polymer degradation and a lowering of optical transparency, the solvent casting method is more likely to be chosen to form a film with a desirable optical transparency. For a polymer with a very high glass transition temperature, such as polyimide (PI, Tg>300° C.), the melt extrusion method for film forming is not feasible and the solvent casting method is used.

When a transparent film of plastic substrate is formed by a solvent casting method, the roughness of the film is usually reduced compared to that being formed by the melt extrusion method. However, the cost of the solvent casting method is higher and the mechanic property of the resulting film is poorer. Moreover, the organic solvents used in the solvent casting method often lead to environment pollution. The melt extrusion method, not only provides high productivity, but the mechanical property and the surface smoothness of the film can be modified via a biaxial stretching process. Further, the problem of the environment pollution caused by the solvent casting method is precluded. Since the cost of melt extrusion is lower than that of solvent casting, melt extrusion is often applied when cost and productivity are being considered.

Applying a plastic film, such as a polyester film, as a value-added optical film, or a film material in a flexible display device or a solar cell, is actively pursued by the polyester industry.

SUMMARY

Embodiments of the disclosure are directed to a polyester film including a first polyester and a second polyester. The first polyester has a glass transition temperature (Tg) higher than 140° C. and an intrinsic viscosity (I.V.) of about 0.5-1.0 dl/g, and has a repeating unit expressed by formula (I):

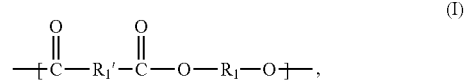

wherein $R_1'$ is a group selected from the following groups:

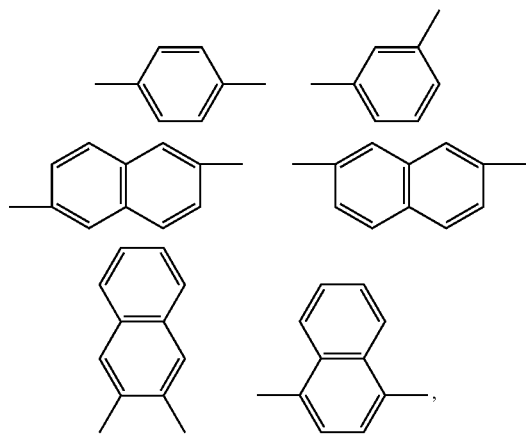

and
$R_1$ is a group selected from the following groups:

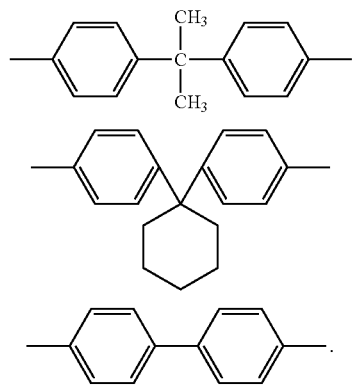

The second polyester has a glass transition temperature (Tg) lower than 140° C. and an intrinsic viscosity (I.V.) of about 0.5-1.0 dl/g, and has a repeating unit expressed by formula (II):

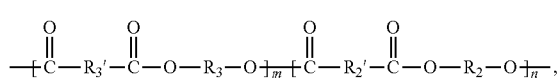

wherein each of $R_2'$ and $R_3'$ is a group selected from the following groups:

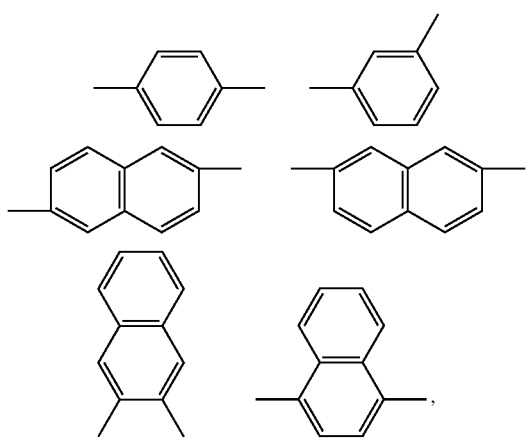

$R_2$ is a group selected from the following groups:

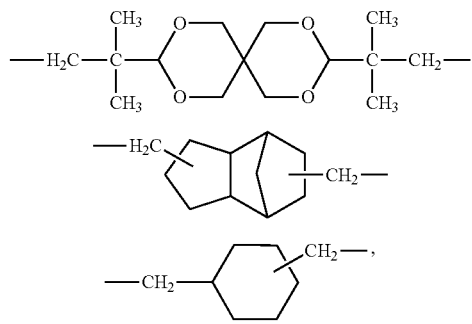

$R_3$ represents —$CH_2CH_2$—, —$CH_2CH_2CH_2$— or —$CH_2CH_2CH_2CH_2$—, m is 0.01 to 1.0, n is 0 to 0.99, and m+n=1.0. The weight ratio of the first polyester to the second polyester ranges from 1:1 to 1:3.

The disclosure is also directed to a method of fabricating a polyester film introduced herein, which includes the following steps. A first polyester and a second polyester are blended, in a weight ratio ranging from 1:1 to 1:3, to form a polyester composition. The first polyester has a glass transition temperature (Tg) higher than 140° C. and an intrinsic viscosity (I.V.) of about 0.5-1.0 dl/g, and has a repeating unit expressed by formula (I):

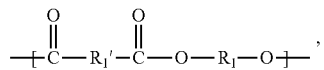

wherein $R_1'$ is a group selected from the following groups:

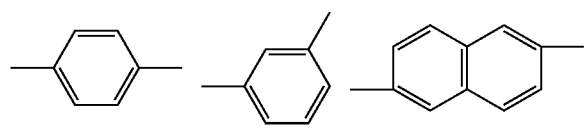

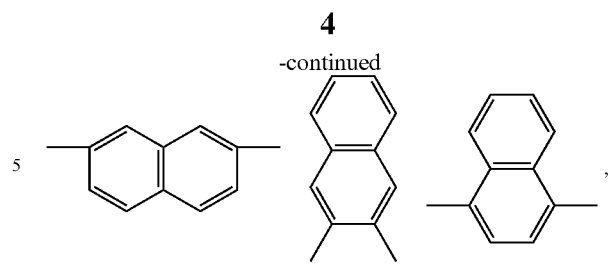

and
$R_1$ is a group selected from the following groups:

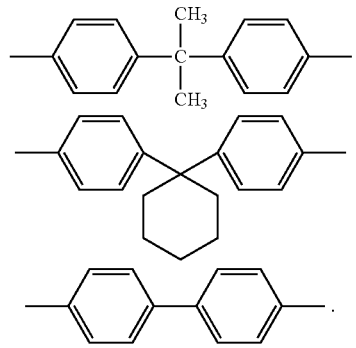

The second polyester has a glass transition temperature (Tg) lower than 140° C. and an intrinsic viscosity (I.V.) of about 0.5-1.0 dl/g, and has a repeating unit expressed by formula (II):

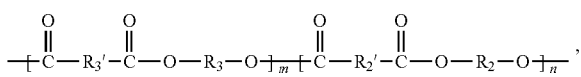

wherein each of $R_2'$ and $R_3'$ is a group selected from the following groups:

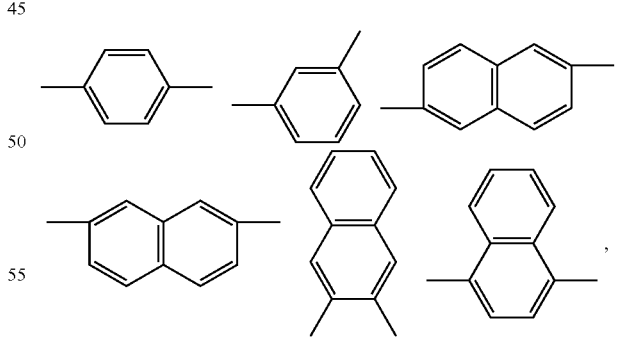

$R_2$ is a group selected from the following groups:

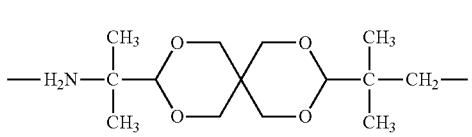

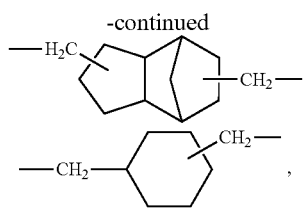

$R_3$ represents —CH$_2$CH$_2$—, —CH$_2$CH$_2$CH$_2$— or —CH$_2$CH$_2$CH$_2$CH$_2$—, m is 0.01 to 1.0, n is 0 to 0.99, and m+n=1.0. A single-layer, non-oriented polyester thin sheet is then formed with the polyester composition and a biaxial stretching is performed on the single-layer, non-oriented polyester thin sheet. A thermal treatment process is then performed.

The polyester film formed from the polyester composition introduced herein is imparted with desirable optical properties, thermal resistance and chemical resistance.

The fabrication method of a polyester film introduced herein provides low fabrication cost and fast production.

For the sake of clear understanding, several exemplary embodiments accompanied with figures are described in detail below to further describe the disclosure in details

DETAILED DESCRIPTION OF DISCLOSED EMBODIMENTS

An exemplary embodiment of this disclosure provides a polyester film including a first polyester and a second polyester. In one exemplary embodiment, the weight ratio of the first polyester to the second polyester ranges from 1:1 to 1:3. In another exemplary embodiment, the content of the first polyester is about 25% to 50% by weight of the polyester composition, and the content of the second polyester is about 50% to 75% by weight of the polyester composition.

The glass transition temperature (Tg) of the first polyester is higher than 140° C., and the intrinsic viscosity (I.V.) of the same is about 0.5-1.0 dl/g. In another exemplary embodiment, the intrinsic viscosity (I.V.) is between about 0.5 to about 1.0 dl/g, and is preferably between about 0.6 to about 0.9 dl/g. The repeating unit of the first polyester is expressed by the following formula (I):

$$\mathrm{+C-R_1'-C-O-R_1-O+}\quad(I)$$

wherein $R_1'$ is a group selected from the following groups:

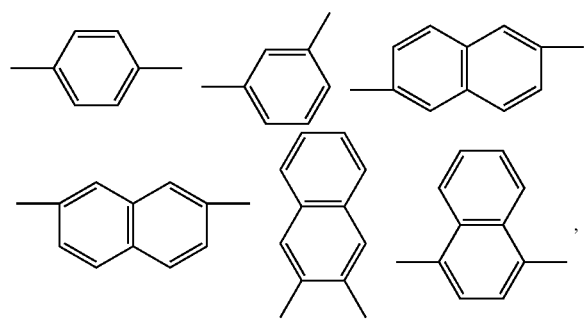

and $R_1$ is a group selected from the following groups:

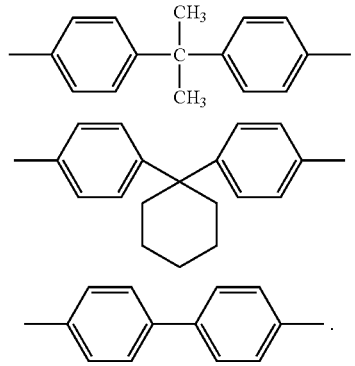

Examples of the above first polyester include polyacrylates. In one exemplary embodiment, the first polyester includes poly(4,4'-isopropylidenediphenylene terephthalate/isophthalate) copolymer:

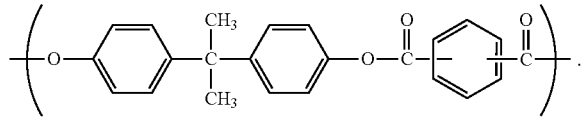

The above first polyester may be formed with a dibasic acid monomer and a diol monomer. For example, the dibasic acid monomer may be an aromatic dibasic acid monomer, such as, terephthalic acid, isophthalic acid, dimethyl-2,6-naphthalenedicarboxylate (NDC), 2,6-naphthoic acid, 2,7-naphthoic acid, 1,4-naphthoic acid, dimethyl-2,7-naphthalenedicarboxylate, dimethyl-2,3-naphthalenedicarboxylate, or a combination thereof, etc. It is noted that the dibasic acid monomer of the disclosure specified herein are exemplary for specific embodiments, and are not to be construed as limiting the scope of the disclosure. The diol monomer may include 2,2-bis(4-hydroxyphenyl)propane also known as bisphenol A, 1,1-bis(4-hydroxyphenyl)cyclohexane also known as bisphenol Z, or 4,4-biphenol. It is noted that the diol monomer specified herein are similarly exemplary for specific embodiments, and are not to be construed as limiting the scope of the disclosure.

The glass transition temperature (Tg) of the above second polyester is lower than 140° C. and the intrinsic viscosity (I.V.) of the same is about 0.5-1.0 dl/g. In another exemplary embodiment, the intrinsic viscosity (I.V.) of the second polyester is between 0.6 dl/g and 0.9 dl/g. The repeating unit of the second polyester is expressed by the following formula (II):

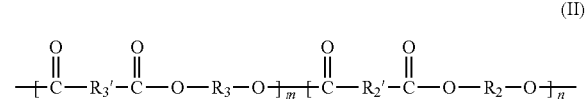

wherein each of $R_2'$ and $R_3'$ is a group selected from the following groups:

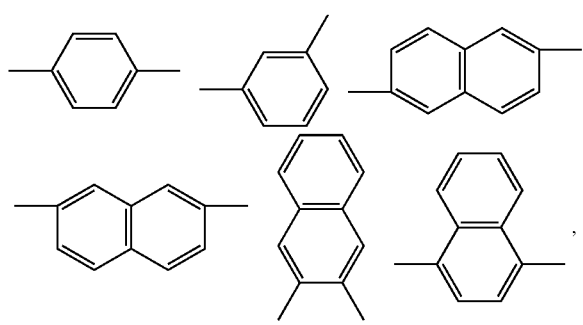

and
R₂ is a group selected from the following groups:

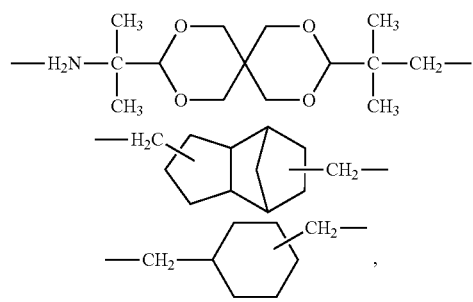

wherein

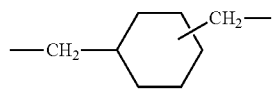

represents

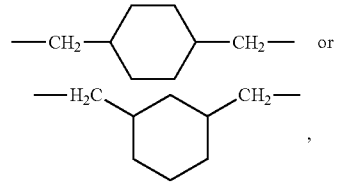 or

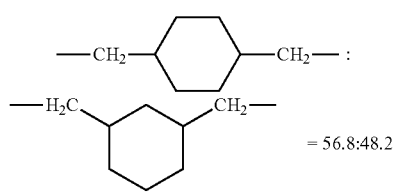

or a combination thereof.
In one exemplary embodiment, the molar ratio of

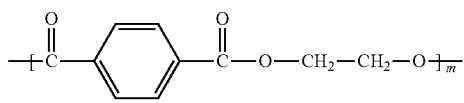 = 56.8:48.2.

$R_3$ represents —$CH_2CH_2$—, —$CH_2CH_2CH_2$— or —$CH_2CH_2CH_2CH_2$—, m is 0.01 to 1.0, n is 0 to 0.99, and m+n=1.0.

The above second polyester includes, for example, polyethylene terephthalate (PET), polyethylene terephthalate glycol (PETG), polyethylene naphthalate (PEN), poly(ethylene-co-tricyclodecanedimethylene naphthalate) (also known as tricyclodecanedimethanol-modified PEN, and abbreviated as "PEND"), poly(ethylene-co-3,9-bis(1,1-dimethyl-2-hydroxyethyl)-2,4,8,10-tetraoxaspiro[5,5]undecane terephthalate) (abbreviated as PETU and also known as 3,9-bis(1,1-dimethyl-2-hydroxyethyl)-2,4,8,10-tetraoxaspiro[5,5]undecane-modified PET), or a combination thereof. The repeating units of PET, PETG, PEN, PEND, PETU are respectively expressed as follows:

PET:

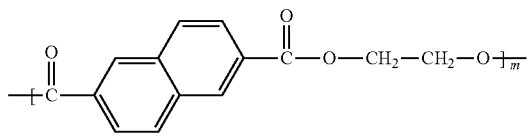

PETG:

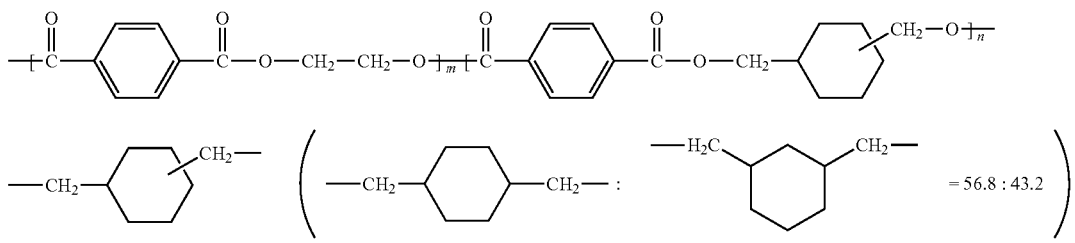

PEN:

PEND:

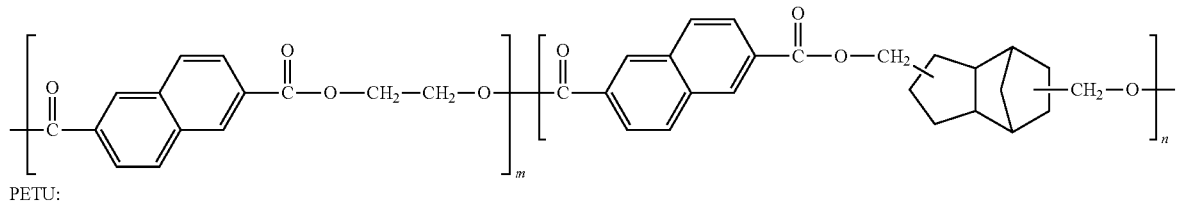

PETU:

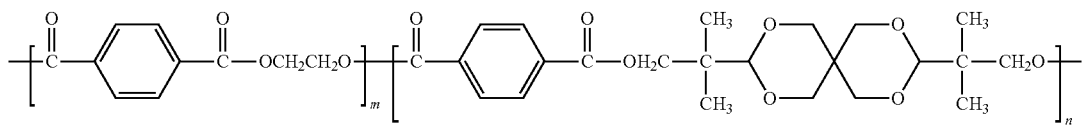

The above-mentioned second polyester may be synthesized with a dibasic acid monomer and a diol monomer. The dibasic acid monomer may include, for example, an aromatic dibasic monomer, such as, terephthalic acid, isophthalic acid, dimethyl 2,6-naphthalenedicarboxylate (NDC), 2,6-naphthoic acid, 2,7-naphthoic acid, 1,4-naphthoic acid, dimethyl 2,7-naphthalenedicarboxylate, dimethyl 2,3-naphthalene-dicarboxylate, or a combination thereof, etc. It is noted that the dibasic acid monomer specified herein are exemplary for specific embodiments, and are not to be construed as limiting the scope of the disclosure. The diol monomer may include, for example, ethylene glycol, propylene glycol, butylene glycol, 1,3/1,4-cyclohexanedimethanol, 1,4-cyclohexanedimethanol, tricyclodecanedimethanol (abbreviated as TCD) or 3,9-bis (1,1-dimethyl-2-hydroxyethyl)-2,4,8,10-tetraoxaspiro[5,5]undecane (abbreviated as BHTU). It is noted that the diol monomer specified herein are exemplary for specific embodiments, and are not to be construed as limiting the scope of the disclosure.

PETU, PETG, PEND are synthesized according to the following exemplary methods, for example.

PETG (polyethylene terephthalate glycol) is a non-crystalline polyester, and may be synthesized by esterification and melt-polycondensation process using terephthalic acid as a dibasic acid monomer, and ethylene glycol (EG), 1,3-cyclohexanedimethanol and 1,4-cyclohexanedimethanol as a diol monomer.

PEND is a non-crystalline polyester and may be synthesized by performing condensation polymerization using dimethyl 2,6-naphthalenedicarboxylate (abbreviated as NDC) as a dibasic acid monomer, and ethylene glycol (EG) and tricyclodecanedimethanol (abbreviated as TCD) as a diol monomer.

PETU is a semi-crystalline polyester, and may be synthesized by performing condensation polymerization using dimethyl terephthalate (abbreviated as DMT) type of dibasic monomer, and ethylene glycol (EG) and 3,9-bis(1,1-dimethyl-2-hydroxyethyl)-2,4,8,10-tetraoxaspiro[5,5]undecane (abbreviated as BHTU) type of diol monomer.

The above polyester composition for forming the polyester film may further include at least one kind of inorganic filler. The inorganic filler may include, for example, a material with an enhanced gas-barrier effect. The amount of the inorganic filler used is less than 6 wt % of the polyester composition. In one exemplary embodiment, the amount of the inorganic filler used is in a range of 0 to 0.5% by weight of the polyester composition. However, it is noted that the amount of the inorganic filler in the polyester composition should not be construed as limited to the exemplary embodiments set forth herein. In an actual application, the amount of the inorganic filler is modified in accordance to the consideration of transparency and the requirements of the mechanical and the winding processes of mass production.

The inorganic filler material may include, for example, silicon dioxide, titanium dioxide, calcium carbonate, barium sulfate, aluminum oxide ($Al_2O_3$), or a combination thereof, etc. In one exemplary embodiment, the inorganic filler includes silicon dioxide. In yet another exemplary embodiment, the inorganic filler includes, for example, a hydrophobic-modified silicon dioxide, a modified clay having a layered structure with a high aspect ratio, or a combination thereof. The hydrophobic-modified silicon dioxide includes, e.g., silane- or siloxane-modified silicon dioxide. The modified clay having a layered structure with a high aspect ratio includes modified clay having two kinds of aspect ratios. The two kinds of aspect ratios of the modified clay have a ratio of 2 or more. In one exemplary embodiment, the modified clay having two aspect ratios includes, a dimethyl distearyl ammonium chloride (DDAC) modified layered clay having an aspect ratio of about 300-400) (for example, Polymer Grade Nonoclay (PGN) purchased from Nonocor Company), and an organomodified layered clay having an aspect ratio of about 75-100 (for example, Cloisite 15A, C15A, purchased from Southern Clay Products Company), which includes dimethyl dehydrogenated tallow quaternary ammonium as the organic modifier.

The fabrication method of the above-mentioned highly thermal-resistant and highly transparent polyester film of an exemplary embodiment includes providing raw materials that include a first polyester and a second polyester. The characteristics, types and amounts of the first polyester and the second polyester are as disclosed above, for example. The raw materials also include an inorganic filler. The types and the amounts of the inorganic filler are as disclosed above. To obviate a high moisture content, which may lead to the degradation of the polymer in subsequent high temperature processes, the raw materials may be dried prior to the homogeneous blending process. For example, to dry PET, an air-circulating drying process divided into two stages is performed. In the first stage, the surface moisture is first removed to prevent the aggregation of particles, and the surface-moisture removal treatment is conducted at a temperature of about 140° C. to about 170° C. for about 20 minutes. In the second stage, a high-temperature air-drying process is performed at about 180° C. for at least over 90 minutes. If vacuum drying is performed, the treatment condition must be at a temperature of about 140° C. to about 150° C. for about 6 to 8 hours to ensure the moisture content is lower to 10 ppm to 30 ppm.

Then, a homogeneous blending of the raw materials is performed to form a homogeneous composition. If an inorganic filler is added, the first polyester and the second polyester plastic beads are uniformly blended, followed by adding and homogeneously mixing the oven-dried inorganic filler to disperse the inorganic filler on the surfaces of the plastic beads. The resulting plastic beads are subsequently melt extruded. Alternatively, the inorganic filler is first uniformly dispersed in either the first polyester or the second polyester, followed by conducting a melt extrusion to obtain high concentrated polyester beads. The high concentrated polyester beads are then homogeneously mixed with another polyester (the first or the second polyester), followed by conducting another melt extrusion process. In other words, the number of times of melt extrusion being performed is not limited. Melt extrusion may be performed more than once, depending on the process requirements in practice.

In an exemplary embodiment, a twin screw extruder is used to perform the dynamic melt blending and the melt process is performed at a temperature of about 180° C. to 400° C. In one exemplary embodiment, the melt process is performed at about 200° C. to 360° C. and the screw rotary speed is, for example, about 50 rpm to 950 rpm. In one exemplary embodiment, the screw rotational speed is about 100 rpm to 900 rpm. After being subjected to kneading, plasticizing, shearing and homogenizing due to the high shear strength of the twin screw extruder, the two types of polymer materials (plastic material) and inorganic material are well mixed. In another exemplary embodiment, the melt mixing process is conducted in a melt blending equipment, such as Brabender, in which the process temperature is between about 180° C. to 400° C. and the rotation speed is about 10 to 100 rpm. In another exemplary embodiment, the process temperature in a Brabender is between about 200° C. to 360° C. and the rotational speed is about 10 to 100 rpm. The homogeneous blending method introduced herein is not limited. The disclosure covers any variations of the blending method provided that the resulting polyester film is transparent.

The above polyester composition is used to form a single-layer, non-oriented polyester thin sheet. Since the solvent casting method is not used in the formation, a solvent is precluded. Fabricating a single-layer, non-oriented polyester thin sheet with the polyester composition is achieved by directly melt extruding the same. In one exemplary embodiment, the melt extrusion process may perform in a twin screw extruder. The above polyester composition, after being melt extruded through the T-type die head of the twin screw extruder and rolled by cooling drum, a film with uniform thickness is obtained. The cooling temperature is normally lower than the glass transition temperature (Tg) to ensure a rapid cooling of the polymer during melting. Hence, the crystallinity of the polymer is controlled to a minimum. If the crystal particles are too large, the haze value increases. Moreover, the product becomes more brittle and results film tearing. Accordingly, a majority of the crystalline plastic materials uses the quench sheet, such that the film-formation quality is enhanced by forming the amorphous molecules of polymer as many as possible. The cooling drum temperature is set between about 50° C. to about 180° C., for example. In one exemplary embodiment, the casting drum temperature is between about 60° C. to about 160° C. In another exemplary embodiment, the cooling drum temperature is between about 70° C. to 140° C. In another exemplary embodiment, another fabrication method of the single-layer, non-oriented polyester thin sheet includes using the polyester composition to directly form a single-layer, non-oriented polyester thin sheet. The another fabrication method includes, extruding the polyester composition into strips, cutting the strips into plastic beads, and then hot-pressing each plastic bead into a single-layer, non-oriented polyester thin sheet.

After obtaining the single-layer, non-oriented polyester thin sheet, a biaxial stretching process is performed. The biaxial stretching process is conducted in a hot-air circulating oven, wherein a single time simultaneous stretching or a sequential stretching or a continuous two-stage stretching is performed. First, a longitudinal stretch is performed with the hot rolling method for enhancing the tensile strength of the mechanical direction. Then, a transverse stretch in the transverse direction (TD) is performed in the oven. In essence, the test sample is first heated by the uniformly circulating hot air, followed by the transverse stretching.

In one exemplary embodiment, Bruckner KARI OV biaxial stretching machine is used to perform the single-time simultaneous stretching. During the stretching process, the molecules are orientated and a biaxial oriented film is formed. The stretching temperature of the biaxial stretching process is about 80° C. to about 250° C. In one exemplary embodiment, the stretching temperature is between about 90° C. to about 240° C. In another exemplary embodiment, the stretching temperature is between about 100° C. to about 220° C. The rotation speed of the hot-air circulation motor is, for example, 800 rpm to 2600 rpm. In another exemplary embodiment, the rotational speed of the hot-air circulation motor is between about 1400 rpm to 1800 rpm. The stretching speed is, e.g., 1-100 mm/sec, and the stretching factor is, e.g., 1-7.

Thereafter, a thermal treatment is performed. The polymer chains, after being subjected to the biaxial stretching, are pulled apart and straightened due to the external stress and temperature, and the shifting between molecules generates a substantially large deformation in the polymer. If the polymer thin sheet is shaped by quenching to a temperature below Tg, the material's dimension is unstable due to the residual stress inside the molecules. Hence, thermally setting a film material must be conducted in stages. The purposes of performing the thermal setting treatment to the different materials vary. For a crystalline polymer, thermal setting is for increasing the rate of second crystallization or the crystal growth process of the polymer, eliminating internal stress of the film, and enhancing crystallinity. Hence, the crystalline structure can be perfected and the mechanical performance is enhanced, and thermal contraction of the film is reduced. For a non-crystalline polymer, thermal setting is to provide relaxation to the short chains and the branch chains of the polymer subsequent to stretching, to eliminate internal stress of the film, and to reduce the thermal contraction of the film. The thermal treatment of this exemplary embodiment of the disclosure is conducted at a temperature of, for example, about 80° C. to about 250° C. In one exemplary embodiment, the thermal treatment is performed between about 90° C. to 240° C. In yet another exemplary embodiment, the thermal treatment is performed between about 120° C. to 220° C. The duration of the thermal treatment is about 3 seconds to about 180 seconds, for example.

According to the above disclosure, the method of using a polymer to form a single-layer, non-oriented thin sheet is achieved by using a twin screw extruder to directly extrude the polymer into a thin sheet. In another exemplary embodiment, a twin screw extruder is used to extrude the polymer into strips, followed by cutting the strips into plastic beads and thermally pressing the plastic beads to form a single-layer, non-oriented thin sheet. Alternatively, a blending method, for example, using Brabender, may also be applied to form a transparent film, and the method of homogeneous blending is not particularly limited.

Exemplary Embodiment 1 <PAR/PET Polyester>

The poly(4,4'-isopropylidenediphenylene terephthalate/isophthalate) copolymer (abbreviated as PAR)

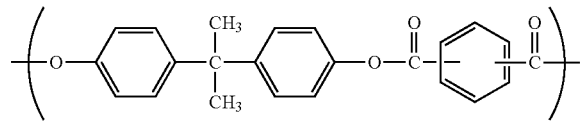

and PET plastic beads are sieved using a vibrating screen to remove the dust particles and fine debris on the surface of the plastic beads, and are subsequently dried in a hot-air circulating oven at 100° C. for 24 hours to ensure the plastic beads are thoroughly dried. Then, 50 part-by-weight of PET and 50 part-by-weight of PAR are respectively obtained and homogeneously blended, followed by a melt-blending process using a twin screw extruder. The melt process is performed at a temperature of about 255° C. to about 330° C., and the screw rotational speed is about 300 rpm to about 500 rpm. After being melt extruded with a T-shape die head, a transparent thin sheet with uniform thickness is obtained. The temperature of the cooling drum is set at about 70° C. to about 80° C. After obtaining the thin sheet, the thin sheet is cut into a dimension of 117 mm×117 mm and a simultaneous biaxial stretching is performed. The stretching temperature is set between about 160° C. to about 165° C., the rotational speed of the hot-air circulation motor is set at 1700 rpm, and the stretching rate is about 10 mm/second. The stretching factor is 3. Ultimately, a thermal treatment is performed and the thermal treatment is conducted at a thermal treatment temperature of about 160° C. to about 190° C. for about 10 seconds to 180 seconds.

Second Exemplary Embodiment <PAR/PET Polyester with Silicon Dioxide>

The PET and PAR plastic beads are sieved with a vibrating screen to remove the dust particles and fine debris on the surfaces of the plastic beads, followed by drying in a hot-air circulating oven at about 100° C. for about 24 hours to ensure the plastic beads are thoroughly dried. Super fine, nano-grade hydrophobic fumed silicon dioxide is provided (provide) and is vacuumed dried at 75° C. for 12 hours. Then, 50 part-by-weight of PET and 50 part-by-weight of PAR are respectively obtained and homogeneously blended together. 0.5 part-by-weight of silicon dioxide is added and evenly dispersed on the surface of the plastic beads. Thereafter, a melt blending is performed using a twin screw extruder. The melt process is performed at a temperature of about 255° C. to 330° C. and the screw rotational speed is set about 300 to 500 rpm. After being melt extruded with a T-shape die head, a transparent thin sheet with uniform thickness is obtained. The casting drum is set at temperature of about 70° C. to about 80° C. After obtaining the thin sheet, the thin sheet is cut into pieces and each piece has a dimension of 117 mm×117 mm, and a simultaneous biaxial stretching is performed. The stretching temperature is set between about 160° C. to 165° C., the rotational speed of the hot-air circulation motor is set at 1700 rpm, and the stretching rate is about 10 mm/second. The stretching factor is 3. Ultimately, a thermal treatment is performed and the thermal treatment is conducted at a thermal treatment temperature of about 160° C. to about 190° C. for about 10 second to about 180 second.

Third Exemplary Embodiment <PAR/PETG Polyester>

A method similar to that in the First Exemplary Embodiment is applied except that PET is replaced by PETG. The drying condition is changed to vacuum drying at about 65° C. for about 12 hours. Moreover, a twin screw extruder is used to conduct the melt-blending. The melt-blending process is conducted at a temperature of about 220-330° C., and the casting drum temperature is set at about 80-90° C.

Fourth Exemplary Embodiment <PAR/PETG Polyester with Silicon Dioxide>

A method similar to that in the Second Exemplary Embodiment is applied except that PET is replaced by PETG. The drying condition is changed to vacuum drying at about 65° C. for about 12 hours. Moreover, a twin screw extruder is used to conduct the melt-blending. The melt-blending process is performed at a temperature of about 220° C. to about 330° C., and the casting drum temperature is set at 80° C. to 90° C.

Fifth Exemplary Embodiment <PAR/PEN Polyester>

A method similar to that in the First Exemplary Embodiment is applied except that PET is replaced by PEN. Moreover, a twin screw extruder is used to conduct the melt-blending. The melt-blending process is performed at a temperature of about 270° C. to about 335° C., and the casting drum temperature is set at about 80° C. to about 90° C. The biaxial stretching temperature is set at about 190° C. to about 195° C.

Sixth Exemplary Embodiment <PAR/PEN Polyester with Silicon Dioxide>

A method similar to that in the second Exemplary Embodiment is applied except that PET is changed to PEN. Moreover, a twin screw extruder is used to conduct the melt-blending. The melt-blending process is conducted at a temperature of about 270-335° C., and the casting drum temperature is set at about 80-90° C. The biaxial stretching temperature is set at about 190-195° C.

Seventh Exemplary Embodiment <PETU/PAR Polyester>

The PETU and PAR plastic beads are sieved with a vibrating screen to remove the dust particles and fine debris on the surfaces of the plastic beads, followed by drying in a hot-air circulating oven at about 100° C. for about 24 hours to ensure that the plastic beads are completely dried. Then, 50 part-by-weight of PETU and 50 part-by-weight of PAR are respectively obtained and are homogeneously blended, followed by a melt mixing process using Brabender. The melt-blending process is performed at a temperature of about 300° C. to about 340° C., and the screw rotational speed is about 50 rpm. After the sample is prepared, it is thermopressed to obtain a transparent thin sheet with a uniform thickness. The thermopressing temperature is at about 300° C. to about 340° C. After the thin sheet is formed, it is cut into a pieces and each pieces has a dimension of 117 mm×117 mm, and a simultaneous biaxial stretching is performed. The stretching temperature is set between about 190° C. to about 205° C., the rotary speed of the hot-air circulation motor is set at 1700 rpm, and the stretching rate is about 10 mm/second. The stretching factor is 2. Ultimately, a thermal process is performed at a temperature of about 160-190° C. for about 10-180 seconds.

Eighth Exemplary Embodiment <PAR/PEND Polyester>

A method similar to that in the First Exemplary Embodiment is applied except that PET is replaced by PEND by homogeneously blending 75 part-by-weight of PEND and 25 part-by-weight of PAR. The blending process is performed at a temperature of about 270° C. to about 340° C. and the cooling drum temperature is set at about 80° C. to about 90° C. The biaxial stretching temperature is set at about 190° C. to about 215° C. The stretching factor is 2. Subsequently, a thermal treatment is performed at a temperature of about 170-200° C. for about 10-180 seconds.

Ninth Exemplary Embodiment <PAR/PEND Polyester>

A method similar to that in the First Exemplary Embodiment is applied, wherein the ratio of PEND and PAR is changed to 50 part-by-weight of PEND and 50 part-by-weight of PAR.

Comparative Example 1

The PET plastic beads are sieved using a vibrating screen to remove the dust particles and fine debris on the surfaces of the plastic beads and are subsequently dried in a hot-air circulating oven at about 100° C. for about 24 hours to ensure the plastic beads are completely dried. Then, 100 part-by-weight of PET is formed and is hot pressed to obtain a transparent thin sheet with uniform thickness. The thermal pressing temperature is set at about 270-280° C. The thin sheet is cut into a dimension of 117 mm×117 mm and a simultaneous biaxial stretching process is conducted. The stretching temperature is set at between about 85° C. to about 95° C., the rotation speed of the hot-air circulation motor is set at 1700 rpm, and the stretching rate is about 10 mm/sec. The stretching factor is 3. Ultimately, a thermal treatment is performed and the thermal treatment is conducted at a thermal treatment temperature of about 190-210° C. for about 3-9 seconds.

Comparative Example 2

The PET and polyether imide (abbreviated as PEI, Tg≈226° C.) plastic beads are sieved using a vibrating screen to remove the dust particles and fine debris on the surfaces of the plastic beads and are subsequently dried in a hot-air circulating oven at 100° C. for about 24 hours to ensure the plastic beads are completely dried. Then, 50 part-by-weight of PET and 50 part-by-weight of PEI are respectively formed and homogeneously blended, followed by performing a dynamic melt-blending process using a twin screw extruder. The melt-blending process is performed at a temperature of about 250-330° C., and the screw rotational speed is set at about 300-500 rpm. After being melt extruded with a T-shape die head, a transparent thin sheet with a uniform thickness is obtained. The cooling drum is set at a temperature of about 70° C. to about 80° C. After obtaining the thin sheet, it is cut into a dimension of 117 mm×117 mm and a simultaneous biaxial stretching is performed. The stretching temperature is set at between about 160° C. to about 165° C., the rotation speed of the hot-air circulation motor is set at about 1700 rpm, and the stretching rate is about 5 mm/second. The stretching factor is 2. Ultimately, a thermal process is performed at temperature of about 160-190° C. for about 10-180 seconds.

TABLE 1

|  | Blending Composition | Ratio | Draw Ratio | DSC Tg (° C.) | DMA tan δ peak temp. (° C.) |
| --- | --- | --- | --- | --- | --- |
| Comparative Example 1 | PET | 100 | 3 × 3 | 80 | 98 |
| Comparative Example 2 | PET/PEI | 50/50 | 2 × 2 | — | 151 |
| Embodiment 1 | PET/PAR | 50/50 | 3 × 3 | 110 | 123 |
| Embodiment 2 | PET/PAR/SiO$_2$ | 50/50/0.5 | 3 × 3 | 110 | 122 |
| Embodiment 3 | PETG/PAR | 50/50 | 3 × 3 | 115 | 128 |
| Embodiment 4 | PETG/PAR/SiO$_2$ | 50/50/0.5 | 3 × 3 | 115 | 128 |
| Embodiment 5 | PEN/PAR | 50/50 | 3 × 3 | 140 | 160 |
| Embodiment 6 | PEN/PAR/SiO$_2$ | 50/50/0.5 | 3 × 3 | 141 | 158 |
| Embodiment 7 | PETU/PAR | 50/50 | 2 × 2 | 140 | — |
| Embodiment 8 | PEND/PAR | 75/25 | 2 × 2 | 144 | 164 |
| Embodiment 9 | PEND/PAR | 50/50 | 2 × 2 | 153 | 175 |

TABLE 2

|  | Blending Composition | Ratio | Draw Ratio | Thickness (μm) | Total Light Transparency Rate (%) |
| --- | --- | --- | --- | --- | --- |
| Comparative Example 1 | PET | 100 | 3 × 3 | 90 | 91 |
| Comparative Example 2 | PET/PEI | 50/50 | 2 × 2 | 150 | 78 |
| Embodiment 1 | PET/PAR | 50/50 | 3 × 3 | 90 | 91 |
| Embodiment 2 | PET/PAR/SiO$_2$ | 50/50/0.5 | 3 × 3 | 80 | 90 |
| Embodiment 3 | PETG/PAR | 50/50 | 3 × 3 | 90 | 90 |
| Embodiment 4 | PETG/PAR/SiO$_2$ | 50/50/0.5 | 3 × 3 | 70 | 89 |
| Embodiment 5 | PEN/PAR | 50/50 | 3 × 3 | 80 | 91 |
| Embodiment 6 | PEN/PAR/SiO$_2$ | 50/50/0.5 | 3 × 3 | 80 | 90 |
| Embodiment 7 | PETU/PAR | 50/50 | 2 × 2 | 200 | 88 |
| Embodiment 8 | PEND/PAR | 75/25 | 2 × 2 | 320 | 90 |
| Embodiment 9 | PEND/PAR | 50/50 | 2 × 2 | 450 | 89 |

The DSC and DMA measurement results of the Exemplary Embodiments and Comparative Examples are summarized in Table 1. The single glass-transition temperatures of the polyester films in Exemplary Embodiments 1 to 9, as measured by DSC, are approximately between 110° C. and 153° C. The results indicate that the two phases are highly compatible, and the glass-transition temperature is increased by 30° C. to 73° C., as comparing with the glass-transition temperature of 80° C. of the PET polyester film in Comparative Example 1.

The results of the transparency measurement of the Exemplary Embodiments and Comparative Examples are summarized in Table 2. After blending two polyesters of the exemplary embodiments of the disclosure, a high-transparency effect is displayed. The total light transmittance is 88% to 91%, wherein the transmittance of the blend, which is very close to that of a PET optical film, must be greater than 89%.

Based on the experimental results, the biaxial oriented polymer films of the exemplary embodiments of the disclosure have the properties of high thermal-resistance and high transparency; hence, they are very useful as an optical film of a flat display device, for example, an protected film of a liquid crystal display device, a release film, a brightness enhanced film, an optical compensation film (phase retardation film), a polarizing film, a polarizer protected film, an anti-glare film, a conductive film, etc. type of optical film, light guide plate, diffusion film, reflective film, or substrate film of touch panel. Further, the above biaxial oriented polymer film may be used as a flexible substrate or a flexible display substrate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A polyester film, comprising:
a first polyester having a glass transition temperature (Tg) higher than 140° C. and an intrinsic viscosity (I.V.) of about 0.5-1.0 dl/g, and having a repeating unit expressed by formula (I):

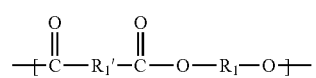

wherein R$_1$' is a group selected from

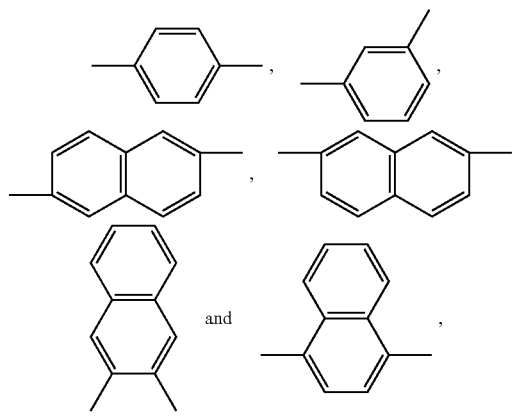

and

R$_1$ is a group selected from

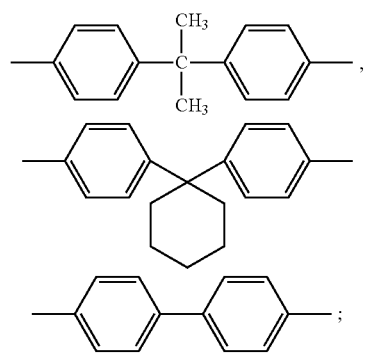

and
- a second polyester having a glass transition temperature (Tg) lower than 140° C. and an intrinsic viscosity (I.V.) of 0.5-1.0 dl/g,
- the second polyester is selected from the group consisting of polyethylene terephthalate (PET), polyethylene terephthalate glycol (PETG), polyethylene naphthalate (PEN), poly(ethylene-co-tricyclodecanedimethylene naphthalate), poly(ethylene-co-3,9-bis(1,1-dimethyl-2-hydroxyethyl)-2,4,8,10-tetraoxa-spiro [5,5]undecane terephthalate, and a combination thereof,
- wherein a weight ratio of the first polyester to the second polyester ranges from 1:1 to 1:3.

2. The polyester film of claim 1, wherein the first polyester comprises poly(4,4'-isopropylidenediphenylene terephthalate/isophthalate) copolymer).

3. The polyester film of claim 1, further comprising an inorganic filler in a content less than 6 wt % of a weight of the polyester composition.

4. The polyester film of claim 3, wherein the inorganic filler comprises hydrophobic-modified silicon dioxide, a modified clay having a layered structure, or a combination thereof.

5. The polyester film of claim 4, wherein the hydrophobic-modified silicon dioxide comprises silane- or siloxane-modified silicon dioxide.

6. A flat-panel display device optical film, comprising a highly thermal-resistant and highly transparent polyester film of claim 1.

7. A method of fabricating a polyester film, comprising:
providing a first polyester and a second polyester, wherein the first polyester has a glass transition temperature (Tg) higher than 140° C. and an intrinsic viscosity (I.V.) of about 0.5-1.0 dl/g, and has a repeating unit expressed by formula (I):

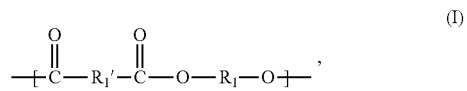

wherein R$_1$' is a group selected from

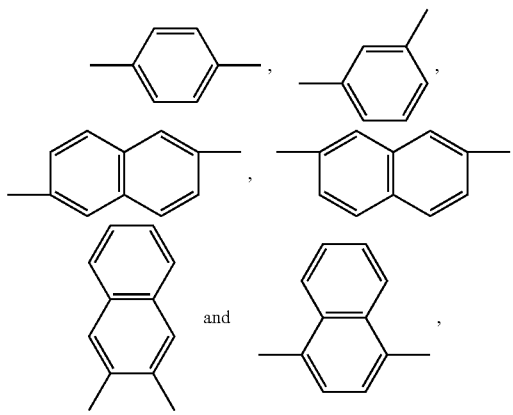

and

R$_1$ is a group selected from

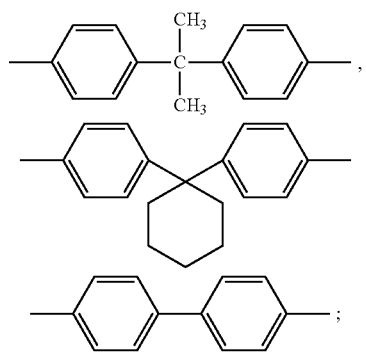

and
the second polyester has a glass transition temperature (Tg) lower than 140° C. and an intrinsic viscosity (I.V.) of about 0.5-1.0 dl/g,
- the second polyester comprises polyethylene terephthalate (PET), polyethylene terephthalate glycol (PETG), polyethylene naphthalate (PEN), poly(ethylene-co-tricyclodecanedimethylene naphthalate), poly(ethylene-co-3,9-bis(1,1-dimethyl-2-hydroxyethyl)-2,4,8,10-tetraoxaspiro [5,5]undecane terephthalate, or a combination thereof;
- blending the first polyester and the second polyester to faun a polyester composition, wherein a weight ratio of the first polyester to the second polyester ranges from 1:1 to 1:3;

forming a single-layer, non-oriented polyester thin sheet with the polyester composition;
performing a biaxial stretching process to the single-layer, non-oriented polyester thin sheet; and
performing a thermal treatment process.

8. The method of claim 7, wherein the first polyester comprises poly(4,4'-isopropylidenediphenylene terephthalate/isophthalate) copolymer.

9. The method of claim 7, further comprising adding to the polyester composition an inorganic filler in an amount less than about 6 wt % of a weight of the polyester composition.

* * * * *